Nov. 26, 1963  H. LEUENBERGER  3,112,101
METHOD AND APPARATUS FOR CALCINATION
Filed Feb. 28, 1958
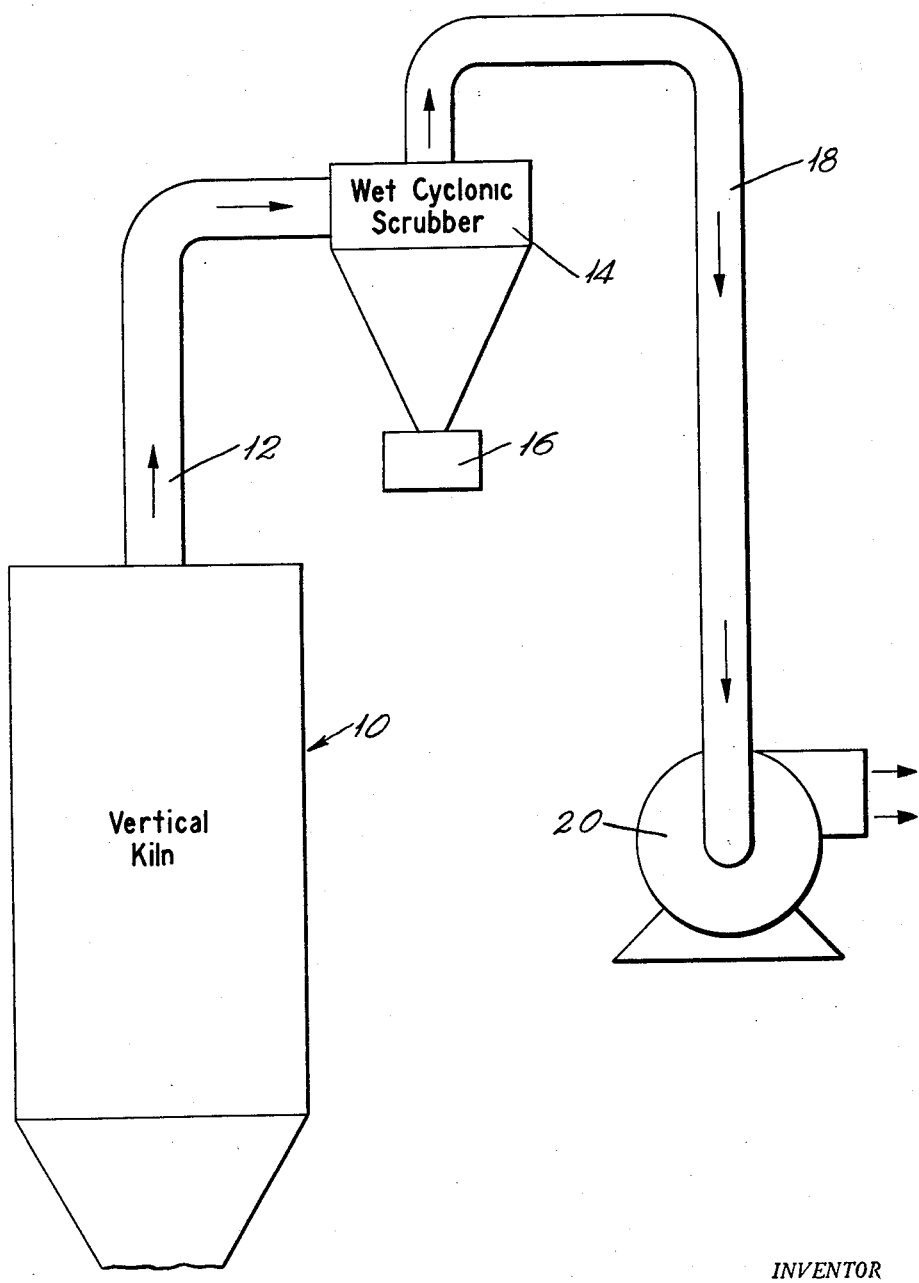
INVENTOR
HANS LEUENBERGER
BY
[signature]
ATTORNEY

3,112,101
METHOD AND APPARATUS FOR CALCINATION
Hans Leuenberger, Niagara Falls, N.Y., assignor to Union Carbide Corporation, a corporation of New York
Filed Feb. 28, 1958, Ser. No. 718,200
5 Claims. (Cl. 263—29)

This invention relates to improved method and apparatus for the calcination of solid substances in a vertical kiln.

The vertical kiln differs from both the fluidized bed kiln and the rotary kiln in that the production rate may be varied by controlling the draft through the kiln. In the fluidized bed kiln, flow velocity supports the individual particles and maintains a fluidized condition. The draft therefore, is highly critical and little variation is possible. In rotary kiln operation, maintenance of a given draft is virtually no problem due to the large free volume of the kiln and the relatively low portion of space occupied by the charge. These factors allow free movement of the gases.

It has long been known in the art that production increases as the draft through the kiln increases. A number of factors have hitherto imposed severe limitations on the attainment of increased draft. It has been suggested, for example, that increased draft may be secured by the use of two induced draft fans in series. However, when fans are used in this manner it becomes difficult to match the flow characteristics of the kiln and the kiln exhaust must be partially throttled. Also, since each fan handles the same dust-laden air, the fan erosion rate is doubled. Another suggested method for increasing kiln draft was that water sprays be used to cool the effluent gases and thus increase the density of the gas prior to its entering the induced draft fan. However, this method was found to be impractical as it caused a build-up of deposits in the exhaust gas lines which more than doubled the pressure drop in the exhaust ducts.

It is, therefore, the primary object of the present invention to increase the production rate of a vertical kiln unit.

Further objects of the present invention are to remove solids from the kiln effluent gases, to eliminate erosion of the induced draft fan, to densify the effluent gases, and to prevent air pollution.

The above objects are attained by cleaning and cooling the effluent gases of a vertical kiln to densify said gases and remove entrained particles therefrom and passing the cleaned and densified gases to an induced draft exhaust fan.

The attached drawing shows in schematic form a preferred embodiment of the invention in which a wet cyclonic scrubber is incorporated into the train of operation of a vertical kiln. Gases and entrained dust flow upward from kiln 10 through duct 12 into scrubber 14 as indicated by the arrows. A standard commercial scrubber may be used in which the gases are whirled cyclonically and are washed with water to remove the entrained dust particles which are then deposited in hopper 16 for subsequent removal. The water serves not only as a scrubber but simultaneously cools and thus densifies the gases. The cleaned and cooled gases then flow through duct 18 to induced draft exhaust fan 20 where they are ejected from the system. An example of a wet cyclonic scrubber useable in the practice of this invention is a Pease-Anthony Cyclonic Scrubber, manufactured by the Chemical Construction Company.

The draft induced in a kiln with any given fan is directly proportional to the density of the gases and inversely proportional to their absolute temperature. As an example of the greatly increased draft obtainable using the method of the invention, the following tables summarize and compare the results of lime kiln operations conducted under standard conditions without cooling and under the conditions of the invention. The term "SCFM" refers to cubic feet per minute at standard temperature and pressure of 32° F. and 1 atmosphere.

*Table I.—Standard Conditions*

| | | | | |
|---|---|---|---|---|
| CFM Kiln Gas at Fan Inlet | 60,000 | 60,000 | 40,000 | 40,000 |
| Kiln Exit Temperature and Fan Inlet Temperature, ° F | 500 | 600 | 500 | 600 |
| Fan Draft (inches water gauge) | 27.0 | 24.5 | 28.0 | 25.5 |
| Gas Density at Exit Kiln Temperature and Fan Draft (lbs./cu. ft.) | 0.0445 | 0.0406 | 0.0444 | 0.0405 |
| SCFM Kiln Gas | 30,300 | 27,800 | 20,200 | 18,400 |

*Table II.—Water Cooling to Adiabatic Saturation*

| | | | | |
|---|---|---|---|---|
| CFM Gas at Fan Inlet (Kiln Gas Plus Water) | 60,000 | 60,000 | 40,000 | 40,000 |
| Kiln Exit Temperature, ° F | 500 | 600 | 500 | 600 |
| Gas Temperature After Adiabatic Saturation With Water (Fan Inlet Temp.), ° F | 126 | 133 | 126 | 133 |
| Gas Density at Fan Inlet (lbs./cu. ft.) | 0.0661 | 0.0645 | 0.0658 | 0.0642 |
| Draft Produced at Fan Inlet (in. w.g.) | 39.5 | 38.5 | 41.0 | 40.0 |
| Draft Available to Kiln (in. w.g.) | 37.5 | 36.5 | 39.0 | 38.0 |
| SCFM Gas Handled by Fan (Kiln Gas Plus Water) | 48,000 | 47,600 | 31,900 | 31,600 |
| SCFM Water Added | 6,500 | 7,800 | 4,300 | 5,200 |
| Lbs./min. Water Added | 308 | 370 | 205 | 246 |
| Net SCFM Kiln Gas Handled | 41,500 | 39,800 | 27,600 | 26,400 |

It will be seen that in the above examples the maximum draft produced by the fan was increased by the practice of the invention from 28 inches water gauge to 41 inches water gauge. The net draft available to the kiln was increased from 28 inches to 39 inches water gauge as the pressure drop across the scrubber was limited to 2 inches water gauge.

It is to be understood that modifications and variations may be effected without departing from the spirit and scope of the present invention. For example, the description has been limited to a disclosure of the invention as it pertains to the production of lime from limestone. The invention is equally applicable to the calcination of any solid substances in a vertical kiln. For example, the invention covers the production of any metal oxide from the respective carbonate, such as mixed oxides of calcium and magnesium from dolomite, barium oxide from barium carbonate, manganese oxide from rhodochrosite, and the like.

What is claimed is:

1. In the calcination of solid substances in a vertical kiln wherein the charge progresses downwardly while gases progress upwardly through the charge, said kiln having an induced draft fan, the improvement comprising the cleaning and cooling of the effluent gases from said kiln to remove entrained particles and densify said gases and passing said cleaned and cooled gases through said induced draft fan.

2. In the production of metal oxides from the respective carbonates in a vertical kiln wherein the charge progresses downwardly while gases progress upwardly through the charge, said kiln having an induced draft fan, the improvement comprising the cleaning and cooling of the effluent gases from said kiln to remove entrained particles and densify said gases and passing said cleaned and cooled gases through said induced draft fan.

3. In the production of lime by the calcination of limestone in a vertical kiln wherein the limestone charge progresses downwardly while air and other gases progress upwardly through the charge, said kiln having an induced draft fan, the improvement comprising the cleaning and cooling of the effluent gases from said kiln to remove entrained particles and densify said gases and passing said cleaned and cooled gases through said induced draft fan.

4. In the production of lime by the calcination of limestone in a vertical kiln wherein the limestone charge progresses downwardly while air and other gases progress upwardly through the charge, said kiln having an induced draft fan, the improvement comprising the simultaneous cleaning and cooling of the effluent gases from said vertical kiln to remove entrained particles and densify said gases and passing said cleaned and cooled gases through said induced draft fan.

5. In an apparatus for the calcination of solid substances comprising a vertical kiln wherein the charge progresses downwardly while gases progress upwardly through the charge an induced draft fan, and conduit means for conducting gases from said kiln to said fan, the improvement comprising wet cyclonic scrubber means in said conduit between the kiln and induced draft fan whereby the gases from said kiln are cleaned and cooled prior to entering said fan.

References Cited in the file of this patent

UNITED STATES PATENTS

| | | |
|---|---|---|
| 467,264 | Raymond | Jan. 19, 1892 |
| 1,297,639 | Blumberg | Mar. 18, 1919 |
| 2,491,840 | Veazey | Dec. 20, 1949 |
| 2,639,132 | Bradford | May 19, 1953 |